United States Patent
Gushev (10) Patent No.: US 12,507,902 B2
(45) Date of Patent: Dec. 30, 2025

(54) SYSTEM AND METHOD FOR MONITORING OF ATRIAL FIBRILLATION, BLOOD GLUCOSE AND PSYCHOPHISICAL CONDITION BASED ON HEART RATE VARIABILITY

(71) Applicant: INNOVATION DOOEL, Skopje (MK)

(72) Inventor: Marjan Gushev, Skopje (MK)

(73) Assignee: INNOVATION DOOEL, Skopje (MK)

( * ) Notice: Subject to any disclaimer, the term of this patent is extended or adjusted under 35 U.S.C. 154(b) by 377 days.

(21) Appl. No.: 18/279,132

(22) PCT Filed: Dec. 29, 2020

(86) PCT No.: PCT/IB2020/062510
§ 371 (c)(1),
(2) Date: Aug. 28, 2023

(87) PCT Pub. No.: WO2022/144571
PCT Pub. Date: Jul. 7, 2022

(65) Prior Publication Data
US 2024/0298905 A1    Sep. 12, 2024

(51) Int. Cl.
*A61B 5/024* (2006.01)
*A61B 5/00* (2006.01)
(Continued)

(52) U.S. Cl.
CPC ........ *A61B 5/02405* (2013.01); *A61B 5/0245* (2013.01); *A61B 5/165* (2013.01); *A61B 5/352* (2021.01); *A61B 5/361* (2021.01); *A61B 5/7203* (2013.01); *A61B 5/7271* (2013.01); *G16H 50/20* (2018.01); *G16H 50/30* (2018.01); *A61B 5/257* (2021.01); *A61B 5/28* (2021.01)

(58) Field of Classification Search
None
See application file for complete search history.

(56) References Cited

U.S. PATENT DOCUMENTS

2009/0275849 A1* 11/2009 Stewart .............. A61B 5/02405
600/518
2015/0313553 A1    11/2015 Chon et al.

FOREIGN PATENT DOCUMENTS

WO    2020012488 A1    1/2020

OTHER PUBLICATIONS

ISR for International Application No. PCT/IB2020/062510 mailed Sep. 30, 2021.
(Continued)

*Primary Examiner* — Ankit D Tejani
(74) *Attorney, Agent, or Firm* — LADAS & PARRY LLP (57) ABSTRACT

This invention discloses a method to calculate a HRV profile, including variability and irregularity indexes, and detect the psychophysical condition, atrial fibrillation or ability to control glucose. This method receives data from a QRS detector and wearable non-invasive ECG sensor and starts with the calculation of instantaneous pulses and HRV based on pulses instead of heartbeat intervals, and then calculates the variability and irregularity indexes to detect the psychophysical condition, atrial fibrillation and ability to control the glucose level. The results can be sent to the patient, caregiver and doctor as intelligent message customized to avoid emotional stress and provide a gentle advice for current psychophysical and health condition.

18 Claims, 6 Drawing Sheets

(51) Int. Cl.
*A61B 5/0245* (2006.01)
*A61B 5/16* (2006.01)
*A61B 5/352* (2021.01)
*A61B 5/361* (2021.01)
*G16H 50/20* (2018.01)
*G16H 50/30* (2018.01)
*A61B 5/257* (2021.01)
*A61B 5/28* (2021.01)

(56) References Cited

OTHER PUBLICATIONS

Written Opinion for International Application No. PCT/IB2020/062510 mailed Sep. 30, 2021.

* cited by examiner

SYSTEM AND METHOD FOR MONITORING OF ATRIAL FIBRILLATION, BLOOD GLUCOSE AND PSYCHOPHISICAL CONDITION BASED ON HEART RATE VARIABILITY

CROSS REFERENCE TO RELATED APPLICATIONS

This application is a U.S. National Stage Application under 35 U.S.C. § 371 of International Application No. PCT/IB2020/062510 which was filed on 29 Dec. 2020, the disclosures of which is incorporated in their entirety by reference herein.

BACKGROUND OF THE INVENTION

Technical field

The present invention relates to monitoring and estimating psychophysical condition, atrial fibrillation, and ability to regulate glucose levels with an electrocardiogram (ECG) or heartrate sensor and an information-processing device.

State of the art

Many monitoring systems have been invented, developed and marketed over the years with a goal to provide to the patient a higher accuracy in the assessment of a blood glucose level, detection of series of atrial fibrillation, or psychophysical condition based on analysis and processing of data collected from various measured parameters. None of them addresses the methods specified in this invention.

Methods to calculate the heart rate variability (HRV) include detection of variability of the heart rhythm analyzing the time intervals between two heartbeats (Camm et al., 1996). These approaches try to eliminate the irregularities, such as the beats classified as ectopic supraventricular. ventricular. missed, extra. misplaced, or misdetections (artifacts) (Tarvainen and Niskanen, 2012). HRV is calculated in at least the following domains: time, frequency, and other domains (Camm, 1996) for various lengths of ECG measurements, including long-term (24 h), short-term (5 min), and ultra-short-term measurements (less than 5 min), specified by (Shaffer and Ginsberg, 2017), (Baek, et al., 2015). (Kuusela, 2013) to detect autonomic neuropathy (Maser and Lenhard, 2005). (Camm, 1996). On contrary to these methods, our invention invents a new method based on calculation of pulse HRV, where the analysis and processing is provided on the frequency of occurrence of beats (instantaneous pulses), rather than on the time interval between two heartbeats.

Entropy as a statistical measure is mainly used to express if there is dispersion of data over a region of possible data values, such as Shannon entropy. Higher entropy indicates that data are more equally dispersed and lower means data are mainly concentrated around specific data values. However, this entropy value does not calculate if there is a pattern in the data distribution, and therefore, in this context, it detects only variability and does not detect irregularity.

The use of Ambulatory Glucose Profile (AGP) for Continuous Glucose Measurement (CGM) report (Bergenstal et al., 2013), (Battelino et al., 2019), (Johnson et al., 2019) reflects only the measurements of glucose, and in this paper, we invent the heart rate variability profile, as a more general approach to indicate the overall psychophysiological condition, atrial fibrillation or glucose regulation ability.

SUMMARY OF THE INVENTION

Our invention discloses methods for calculation of Heart Rate Variability (HRV), and determination of the psychophysical condition, atrial fibrillation, or ability to regulate blood glucose level by building a HRV profile, based on calculation of the variability without detected heartrate patterns on instantaneous pulses. Disclosed methods use irregularity index that determines if the irregular rhythm consists of regular patterns. Higher variability values with lower irregularity index in the invented profile will mean better psychophysical condition, and ability to control the glucose, while detecting the irregularity in largely dispersed beats means occurrence of atrial fibrillation.

The invention discloses a method that calculates HRV based on processing the frequency of heartbeat occurrence instead on intervals between the heartbeats.

The autonomous nerve system controls the psychophysical condition, heart and the blood glucose level. In cases when the glucose concentration level is higher in the blood the autonomous nervous system reacts with slower rate changes, which is reflected on the pulse HRV calculated by this invention. Present invention relies on techniques that detect the irregularity of heart rhythm and patterns that can classify the irregular rhythms with a certain degree of regularity. Atrial fibrillation is a typical example of irregularly irregular heart rhythm. Detection of regular heart rhythm patterns does not indicate a malfunction of the autonomous nervous system, rather it presents problems of other vital organs.

The invention discloses a system and method that may be implemented by a wireless remote real-time continuous non-invasive heart monitoring system based on a wearable ECG or heartrate sensor for non-hospitalized patients at their home and working environment; and describes algorithms that detect the patterns in irregular rhythms that further can reveal an information about the psychophysical condition, including atrial fibrillation, or glucose regulation ability.

Present invention addresses most challenges for detection of irregularity and heart rhythm patterns and builds methods for more accurate calculation of HRV to be used for estimation of the overall psychophysical condition, ability to regulate glucose levels and detect irregular heart rhythms such as atrial fibrillation. This approach introduces a new method to calculate HRV, optimized for non-invasive wearable ECG or heartrate sensors, and enabling continuous real-time monitoring, and alerting.

The resulting HRV profile with overall estimation of the psychophysical condition specified in this invention enables a real-time monitoring device for caregiver, doctor, and patient. In addition, this invention describes a method that alerts in case of detecting abnormal low or high levels, so a patient can be alerted to take care and measures to prevent dangerous health situations.

DESCRIPTION OF THE DRAWINGS

Features and advantages of this invention will become apparent from the detailed description of one embodiment of the invention in conjunction with the accompanying drawings, wherein.

DETAILED DESCRIPTION OF THE INVENTION

Heart Rhythm

Heart rhythms are determined by the occurrence of heartbeats and classified as regular if the intervals between successive heartbeats are same or within an allowed small difference. Any distraction of this rule is classified as an irregular rhythm. Due to the complex psychophysical condition, the autonomous nerve system reacts to the environmental challenges and activates the heart to pump more blood and bring oxygen to muscles, and/or brain. A heart malfunction may appear due to problems in the heart muscle, and this is usually represented by patterns in the analyzed heart rhythm changes. such as the occurrence of supraventricular (S) or ventricular (V) beats in addition to the normal (N) beats, or arrhythmia classified as bigeminy, trigeminy, or similar arrhythmia as series of pairs, triples or other combination of S and V beats along with N beats. Although these arrhythmias represent irregular rhythms, still they consist of regular patterns. The existing methods detect mainly the irregular rhythms, incapable to detect the patterns or irregularity in these irregular rhythms.

In addition to this, the QRS detector introduces miss detections and artifacts present in noise while ECG is measured, which produces small precision and sensitivity of the existing systems. Heartrate monitors detect beats and their time stamp location and can be used to transfer beat annotations to the system.

The ability to control the glucose is usually measured by the concentration of glycosylated hemoglobin HbA1C and, in this invention, it is calculated by HRV from long-term ECG or heartrate measurements. Lower values of HRV are characterized for diabetic patients with bad glucose regulation and higher for diabetic patients with good control of the glucose by diet, medicaments or insulin intake.

DETAILED DESCRIPTION OF THE EMBODIMENTS

Figure 1:
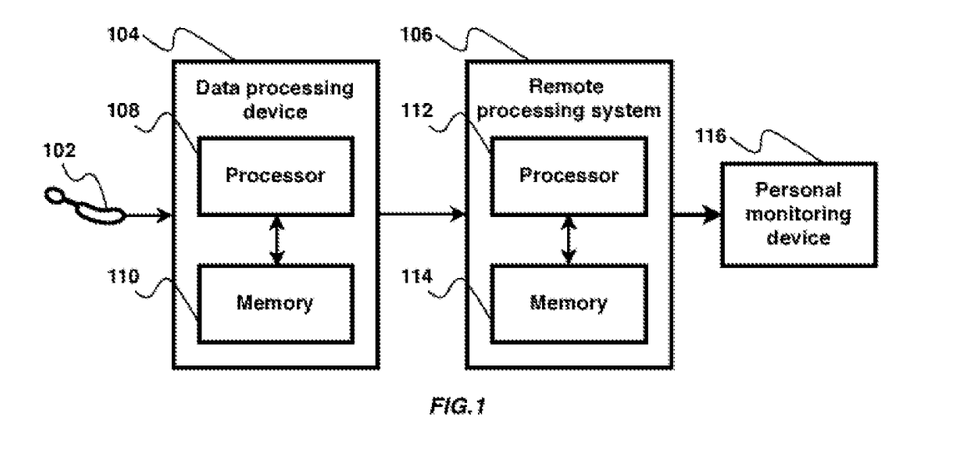
FIG. 1 shows a system for monitoring of a psychophysical condition, ability to control glucose, and atrial fibrillation.

FIG. 1 shows a system for monitoring of psychophysical condition, atrial fibrillation and ability to control glucose, which comprises a sensing device 102 and a data processing device 104.

In one embodiment, the sensing device 102 may be a small wearable single-channel ECG patch that uses a small internal battery to enable long-term measurements. Any mammal may wear said sensing device 102.

In another embodiment, the sensing device 102 may include one or more leads for sensing ECG. In another embodiment, the sensing device may be included in a Holter wired ECG sensing system with one or more leads.

In one embodiment, the sensing device 102 may be a PPG (Photoplethysmography) sensor that analyzes the blood pumping activity.

The sensing device 102 may be coupled to the data processing device 104 with a communication link. Sensed data from the sensing device 102 may be sent to the data processing device 104 over the communication link. In one embodiment the communication link may be personal arena network communication links, such as Bluetooth, infrared, Wi-Fi, ADSL, or any other similar radio communication technology. In another embodiment, the communication link may be based on local area network technologies or wide area network technologies. In another embodiment the communication link may be based on ultrasound, or similar communication technology.

The data processing device 104 comprises a processor 108 and a memory 110. In one embodiment, the data processing device 104 may be configured to receive ECG samples from the ECG sensing device 102 and to store them in the memory 110. The processor 108 may be configured to perform beat detection, beat classification, and annotation sharing. In another embodiment, the data processing device 104 may be configured to receive beat annotations from the sensing device 102.

In various embodiments the data processing device 104 may be realized as a smartphone. tablet, laptop, personal computer, home box, or any other processing and communication device for personal use, or in home or office environment.

The processor 108 may be configured to calculate HRV, fluctuation index, irregularity index, and to build a HRV profile. Then, the processor 108 may be configured to detect the psychophysical condition, ability to regulate glucose, and atrial fibrillation.

In one embodiment, the data processing device 104 may be coupled to a remote processing system 106 via a communication link. The communication link may be realized by a local area network LAN, WiFi, ADSL, optical cable, etc.

The remote device for data analysis 106 comprises a processor 112 and a memory 114. In one embodiment, the remote processing system 106 is coupled to receive ECG data samples. The processor 112 may be configured to run an algorithm to perform extended beat detection and classification. In another embodiment, the remote processing system 106 is coupled to receive beat annotations from the data processing device 104. The processor 112 is capable to store received data in memory 114.

The processor 112 may be configured to calculate HRV, fluctuation index, irregularity index, and build a HRV profile. The processor 112 may be configured to detect the psychophysical condition, ability to regulate glucose, and atrial fibrillation.

In one embodiment the remote processing system 106 may be implemented as a cloud-based system. In another embodiment, the remote processing system 106 may be implemented as a shared data center or a similar processing and communication network environment to share data to other devices.

In one embodiment, the remote processing system 106 may be coupled to a personal monitoring device 116. In another embodiment, the remote processing system 106 may be coupled to a smart device or similar device 116 capable to provide remote monitoring to doctors and caregivers.

Figure 2:
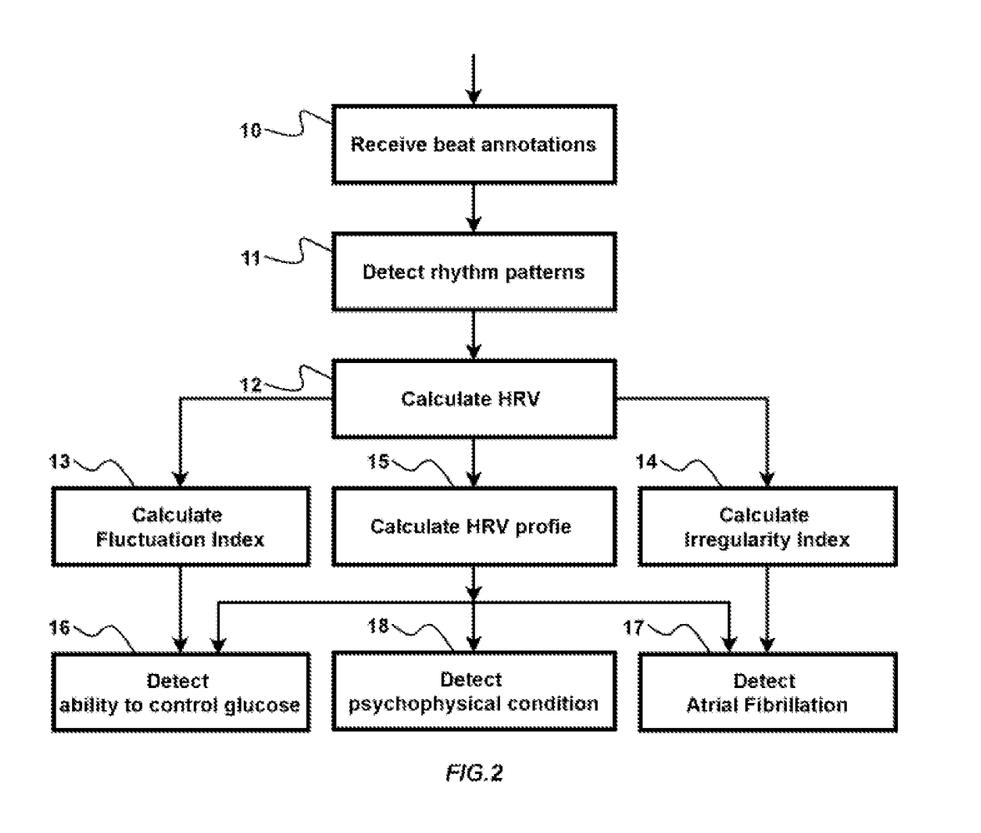
FIG. 2 shows a method for monitoring of a psychophysical condition, ability to control glucose, and atrial fibrillation.

FIG. 2 shows a method for detection of the psychophysical condition, ability to control glucose and atrial fibrillation for a given heartrate measurement with length of time period $T_{TOTAL}$.

In one embodiment, the method for detection of the psychophysical condition, ability to control glucose and atrial fibrillation for a given heartrate measurement with length of time period $T_{TOTAL}$ begins when data processing devices 104 and 106 receive an array of beat annotations (Block 10). In another embodiment, the method begins when data processing devices 104 and 106 receive an array of ECG samples, wherein they are capable to run a QRS detection and beat classification algorithms (Block 10) to generate beat annotations.

The method or detection of the psychophysical condition, ability to control glucose and atrial fibrillation for a given measurement with length of time period $T_{TOTAL}$ begins when it receives beat annotations (Block 10). Then the method detects rhythm patterns and excludes them of further calculation of HRV parameters (Block 11). The method calculates HRV (Block 12). In one embodiment, the method calculates instantaneous pulse and pulse HRV based on instantaneous pulses (Block 12). In another embodiment, the method calculates standard HRV based on beat-to-beat intervals Block 12).

The method then uses calculated HRV values to calculate fluctuation index (Block 13) and irregularity index (Block 14). Then the method builds the HRV profile (Block 15). Then the method calculates the qualitative value of ability to control the glucose level (Block 16), detects existence of atrial fibrillation (Block 17), and detects the psychophysical condition (Block 18).

To calculate instantaneous pulse (heart rate) from received beat annotations, the method may use a reciprocal value of beat-to-beat intervals between succeeding beats, and may convert the value in beats per minute (BPM). The method is configured to eliminate artifacts and wrong detections of the QRS detector that generates beat annotations, by setting thresholds and comparing if the instantaneous pulse (heart rate) is within the limits of a mammal.

The method detects rhythm patterns and eliminates them from further calculation (Block 11). A rhythm pattern may be detected if a beat-to-beat interval deviates from an average beat-to-beat interval of a number $N_A$ of previous beats by a value higher than a predefined threshold $Thr_N$. A rhythm pattern is also detected if this deviation is followed by another deviation that compensates the beat-to-beat interval in such a way that the succeeding beat-to-beat intervals do not deviate from the average beat-to-beat interval of a number $N_A$ of previous beats by a value higher than a predefined threshold $Thr_N$.

A rhythm pattern may be a sequence of two or more beats, which repeats at least three times. A typical example of a rhythm pattern is ventricular bigeminy that is a repetitive sequence of premature beat followed by a normal beat on a compensated time interval. Other examples of rhythm patterns are all similar forms of trigeminy, quadgeminy or their combinations of ventricular or supraventricular beats, existence of ectopic or escape beats followed by normal beats with compensation time interval.

Also, examples of rhythm patterns include a sequence of ectopic beats, usually referred as couples, triplets or longer sequences. Examples of rhythm patterns may include a sequence of beats where the time interval to successors is constantly increasing or decreasing, as they may appear due to psychical irritation or physical activity. All these rhythm patterns are excluded of further calculation of HRV parameters (Block 12) and are further addressed by the method in Block 14.

In one embodiment, when the array of ECG samples is received and processed, the method produces a list of instantaneous pulses (heart rates) approved not to contain artifacts, wrong detections in ECG signals corrupted by noise, and other artificial heartbeat-like detections. In this embodiment, the method is capable to eliminate noise generated by wearable ECG sensors when used during physical activity with a lot of muscle and/or environment noise.

The method produces a list of detected regular rhythms and their location within the measurement which. This list along with the list of beat annotations is used to calculate HRV (block 12). In one embodiment, the list of beat annotations comprises time stamps allocations. In another embodiment, the list of beat annotations comprises beat-to-beat intervals. The method calculates standard HRV based on beat-to-beat intervals (Block 12).

In another embodiment, the list of beat annotations comprises instantaneous pulses (heart rates) to calculate pulse HRV for a given measurement time period $T_{TOTAL}$. (Block 12).

The method calculates HRV using a sliding window method for windows with time lengths $T_P$ and predefined sliding offset $T_O$ (Block 12). In various embodiments, the sliding offset may be 1, 2, 5, 10, 20 and 30 minutes. The method in Block 12 is not limited only to the specified time period lengths $T_P$ and sliding offset $T_O$ and can use any value within the time frame of the heartrate measurement $T_{TOTAL}$ (Block 12).

Figure 3:
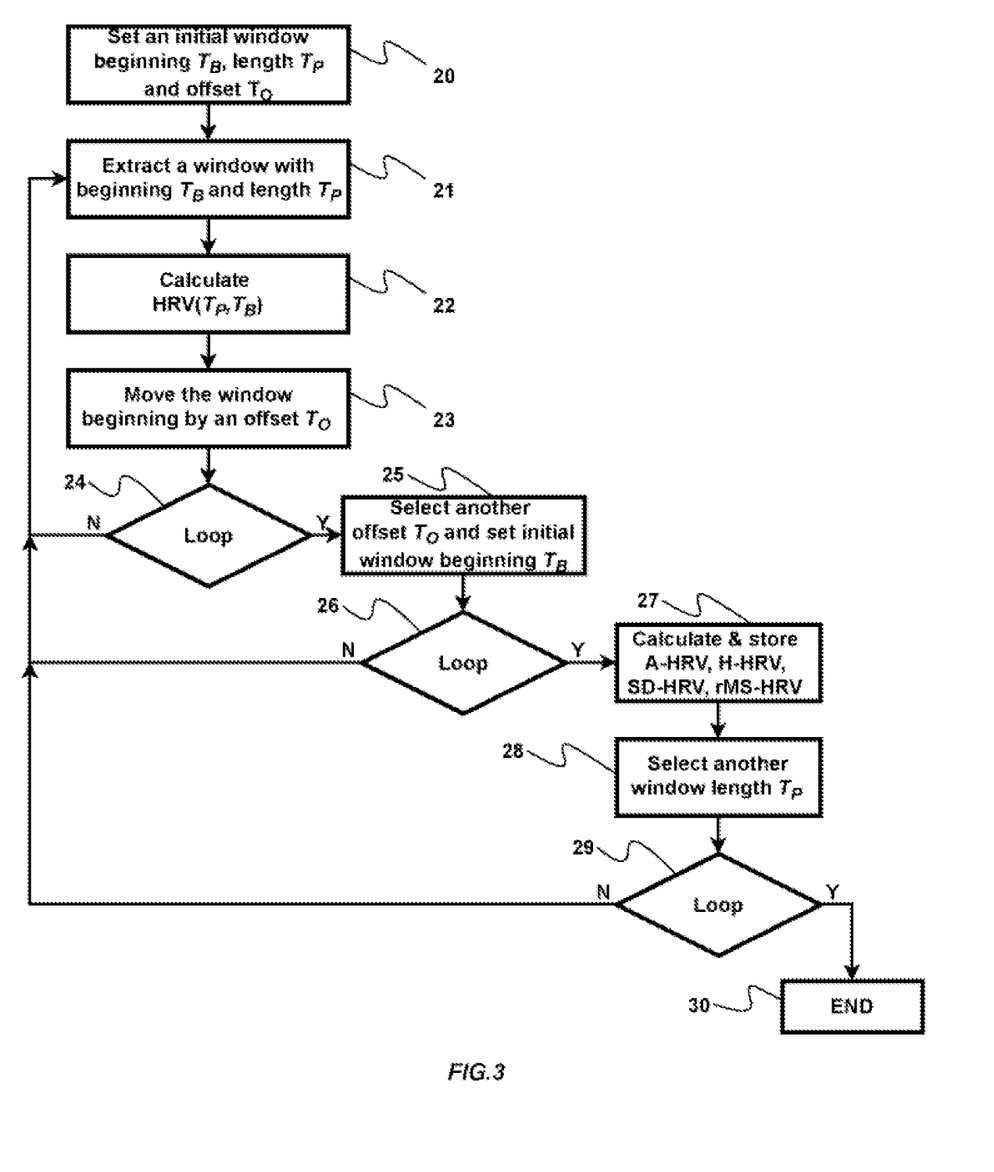
FIG. 3 shows a sliding window method for calculating HRV.

FIG. 3 shows a sliding window method for calculating HRV. The sliding window method traverses all windows with time period lengths $T_P$ and sliding offset $T_O$ where the window fits in the measurement time period $T_{TOTAL}$.

The sliding window method starts by setting an initial value of window beginning $T_B$ window time length of $T_P$ and sliding offset $T_O$ (Block 20). The method then extracts a window with beginning $T_B$ and window time length of $T_P$ and checks if it fits in the measurement time period $T_{TOTAL}$ (Block 21).

The sliding window method calculates HRV for the extracted window with time period lengths $T_O$ and beginning $T_B$ (Block 22). In one embodiment, the sliding window method calculates standard HRV based on beat-to-beat intervals, and may include SDNN, RMSSD, NN50, pNN50 and other domain HRV (Block 22).

In another embodiment, the sliding window method calculates the following pulse HRV parameters (Block 22):

$AP(T_P, T_O)$ The average of all instantaneous pulses/heart rate (expressed in BPM) within a time period length $T_P$ and sliding offset $T_O$ from a given heartrate measurement time period $T_{TOTAL}$.

$HP(T_P, T_O)$ The harmonic mean of all instantaneous pulses/heart rate (expressed in BPM) within a time period length $T_P$ and sliding offset $T_O$ from a given heartrate measurement time period $T_{TOTAL}$.

$SDP(T_P, T_O)$ The standard deviation of all instantaneous pulses/heart rate (expressed in BPM) within a time period length $T_P$ and sliding offset $T_O$ from a given heartrate measurement time period $T_{TOTAL}$.

$rMSSP(T_P, T_O)$ Root mean square of successive instantaneous pulses (heart rates) within a time period length $T_P$ and sliding offset $T_O$ from a given heartrate measurement time period $T_{TOTAL}$.

PT($T_P$, $T_O$) Number of successive instantaneous pulses (heart rates) whose difference is larger than a predefined heartrate threshold $Thr_H$ within a time period length $T_P$ and sliding offset $T_O$ from a given heartrate measurement time period $T_{TOTAL}$.

pPT($T_P$, $T_O$) The ratio between PT($T_P$, $T_O$) and all instantaneous pulses (heart rates) within a time period length $T_P$ and sliding offset $T_O$ from a given heartrate measurement time period $T_{TOTAL}$ (expressed in per mille (parts per thousand).

The sliding window method stores calculated HRV for further processing (Block 22).

The sliding window method calculates the beginning of the new window $T_{B\_new}$ for a value of the sliding offset $T_O$ by calculating the $T_{B\_new} = T_{B\_current} + T_O$ (Block 23).

The sliding window method then checks if the new window fits in the heartrate measurement duration $T_{TOTAL}$ by checking if $T_B + T_P <= T_{TOTAL}$ (Block 24). The sliding window method loops back until all offsets are traversed (N branch of Block 24). If all offsets are traversed for the selected window time length $T_P$ (Y branch of Block 24), the sliding window method continues with selecting another offset $T_O$ and set initial window beginning $T_B = T_O$ (Block 25).

The sliding window method then checks if the new window fits in the heartrate measurement by checking if $T_B + T_P <= T_{TOTAL}$ (Block 26). The method loops back until all offsets are traversed (N branch of Block 26). If all offsets are traversed for the selected window time length $T_P$ (Y branch of Block 26), the sliding window method continues with calculating average, harmonic mean, standard deviation and root mean square of calculated HRV for the specific value of window time period lengths $T_P$ (Block 27). All calculated HRV values are stored for the purpose of further processing of the HRV profile, fluctuation index and irregularity index (Block 27).

The sliding window method continues to select another window time length $T_P$ (Block 28).

Then, the sliding window method checks if the new window time length $T_P$ fits in the heartrate measurement by checking if $T_B + T_P <= T_{TOTAL}$ (Block 29). The method loops back until all window time periods are traversed (N branch of Block 29). If all window time periods are traversed (Y branch of Block 29), the sliding window method ends (Block 30).

The sliding window method calculates the following HRV parameters (Block 27):

A_HRV($T_P$) The average of calculated HRV for intervals with time period length $T_P$.

H_HRV ($T_P$) The harmonic mean of calculated HRV for intervals with time period length $T_P$.

SD_HRV ($T_P$) The standard deviation of calculated HRV for intervals with time period length $T_P$.

rMS_HRV ($T_P$) The mot mean square of calculated HRV for an interval with time period length $T_P$.

The sliding window method loops through all possible window time period lengths $T_P$ and sliding offset $T_O$, starting with an initial value of $T_P = T_{TOTAL}$ and sliding offset $T_O = 0$.

The sliding window method calculates an overall HRV for ($T_{TOTAL}$, 0) for the heartrate measurement $T_{TOTAL}$ without an offset $T_P = 0$, as an overall HRV for the analyzed period.

Figure 7:
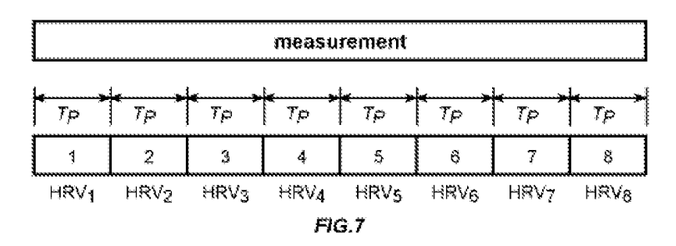
FIG. 7 is an illustration of a heartrate measurement and eight smaller intervals to calculate separate HRV parameters.
Figure 8:
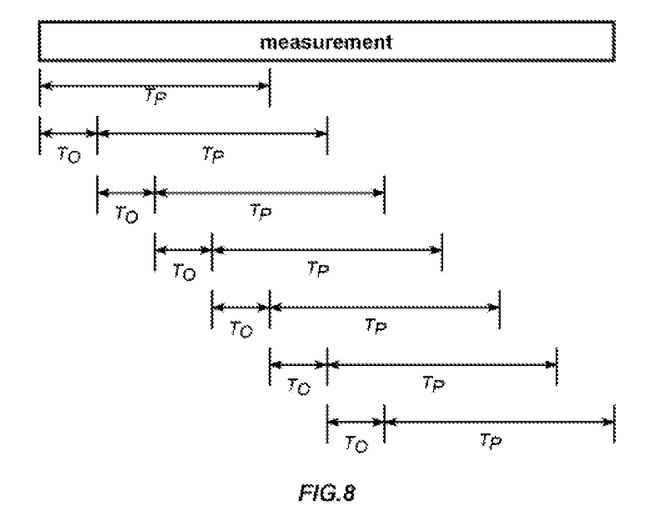
FIG. 8 is an illustration of a heartrate measurement and application of a sliding window method for seven smaller intervals identified with time period lengths $T_P$ and sliding offset $T_O$, used to calculate separate HRV parameters.

In the case when the heartrate measurement with time period $T_{TOTAL}$ is divided in several window intervals with time period lengths $T_P$ and sliding offset $T_O$ then the sliding window method generates a list of calculated HRV values for smaller time intervals. FIG. 7 illustrates a case when the measurement is divided in 8 intervals with the same length value $T_P$ of the time period window and sliding offset. Another case is demonstrated in FIG. 8 to illustrate different values of time period lengths $T_P$ and offset $T_O$ that generate seven sliding windows within one heartrate measurement.

Referring now to FIG. 2. In one embodiment, the method for detection of the psychophysical condition. ability to control glucose and atrial fibrillation may be configured to calculate HRV based on time intervals between succeeding N beats (Block 12). The ASDNN time-domain HRV is a special case of calculating A-SD(5min,5min) HRV parameters for 5-minute intervals based on NN beat-to-beat intervals within 24 h ECG measurement. Also, the SDANN time-domain HRV is a special case of SD-A(5min,5min) HRV parameters for 5-minute intervals based on NN beat-to-beat intervals within 24 h ECO measurement.

The method calculates the fluctuation index for a specific window time period length $T_P$ by finding an average, standard deviation and maximum of HRV values for different sliding offsets $T_O$ (Block 13) The method eliminates the outlier values that are distant from the average and expected range of the majority values One embodiment may include outlier removal by Z-score outlier removal method. Another embodiment may include interquartile range IRQ method for outlier removal. The method calculates a fluctuation index as a ratio between the standard deviation of HRV values and the average HRV value.

The method calculates the irregularity index for a specific window time period length $T_P$ and window beginning $T_B$ by analyzing the detected rhythm patterns (Block 14). The method calculates the irregularity index as a number of beats in the specified measurement window without detected rhythm patterns versus a total number of beats in the specified measurement window. The calculated irregularity index is a value between 0 and 1, where 0 means that there are no detected rhythm patterns, while 1 means that all beats within analyzed time window belong to detected rhythm patterns. The higher value of beats without patterns means higher irregularity.

The method calculates an HRV profile with all values in the set of HRV parameters for specified sizes of the window time length $T_P$ (Block 15). The method calculates the HRV profile by including the corresponding fluctuation indexes and irregularity index for specified sizes of the window time length $T_P$.

In one embodiment HRV profile may be built for each of the following pulse HRV parameters: AP, HP, SDP, rMSSP, P3 and pP3. In another embodiment standard HRV parameters may be calculated on NN intervals, such as SDNN, RMSSD, ASDNN, SDANN, NN50, and pNN50.

The HRV profile may be used to present HRV statistics, where HRV statistics are calculated as an arithmetic average, harmonic mean, standard deviation, or root mean square of all windows with analyzed time period length $T_P$ and different sliding offsets $T_O$ (Block 15). In one embodiment, the HRV profile may contain an overall statistical value (average, harmonic mean, standard deviation, or root mean squared) for a 24 h measurement. Another embodiment of the HRV profile may contain aggregated values of statistical values per each hour of the measurement. Various embodiments may include different time periods to calculate these statistical values.

The HRV profile may include three HRV time ranges denoted as low, normal and high. These three ranges are determined by two threshold values $Thr_A$ and $Thr_B$. The low HRV range includes calculated HRV below $Thr_A$ and the high HRV range includes calculated HRV values higher than $Thr_B$. The calculated HRV values between $Thr_A$ and $Thr_B$ are located in the normal HRV range.

The method calculates the time spent in each of ranges with the following values (Block 15):
  detected time in low HRV range, denoted as DTL;
  detected time in normal HRV range. denoted as DTN;
  detected time in high HRV range, denoted as DTH.

The method uses predefined target times in each of ranges with the following values (Block 15):
  target time in low HRV range, denoted as TTL;
  target time in normal HRV range, denoted as TTN;
  target time in high HRV range, denoted as TTH.

The method calculates the following HRV profile indexes for each of ranges with (Block 15):
  $T_L$ as ratio of the detected time in low HRV range DTL versus target time in low HRV range TTL, denoted as TTL;
  $T_N$ as ratio of the detected time in normal HRV range DTN versus target time in normal HRV range TTN;
  $T_H$ as ratio of the detected time in high HRV range DTH versus target time in high HRV range TTH.

Figure 6:
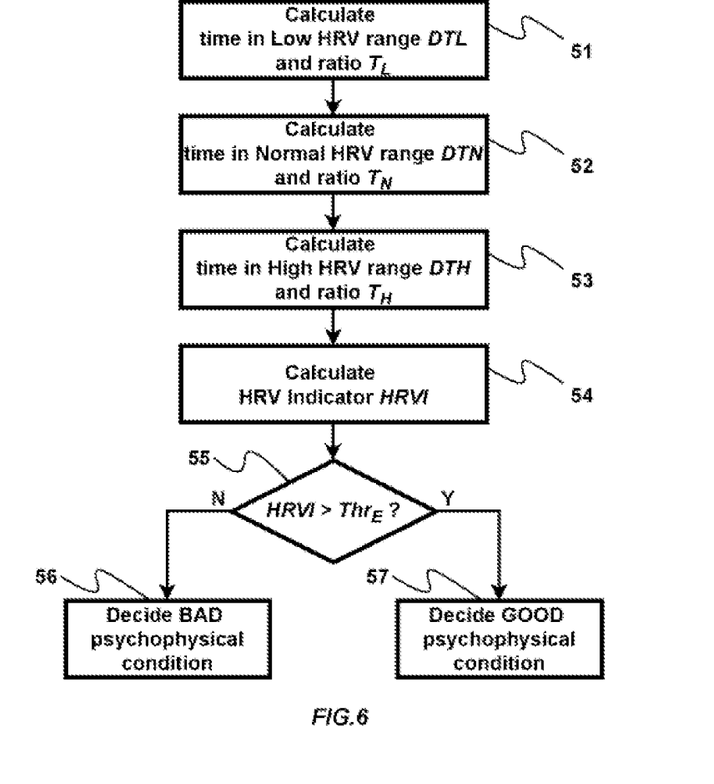
FIG. 6 shows a method for calculating the psychophysical condition.

FIG. 6 shows a method to calculate time spent in Low HRV range DTL and ratio versus target time in low range $T_L$ (Block 51), time spent in Normal HRV range DTN and ratio versus target time in normal range $T_N$ (Block 52). time spent in High HRV range DTH and ratio versus target time in low range $T_H$ (Block 53). These values are further used in method to calculate the psychophysical condition.

One embodiment of the HRV profile may contain an illustration of how much time was measured in each of the ranges and calculate discrepancies of spent time in ranges as ratio of measured and targeted values. These values may be further used to process the psychophysical condition (Block 18).

In another embodiment, the HRV profile may include the daily dispersion of HRV, plotted within a graphic plot. In another embodiment, the HRV profile may include identification of quartiles and marking the median values with line and inner quartiles with different color from the outer quartile values.

Figure 4:
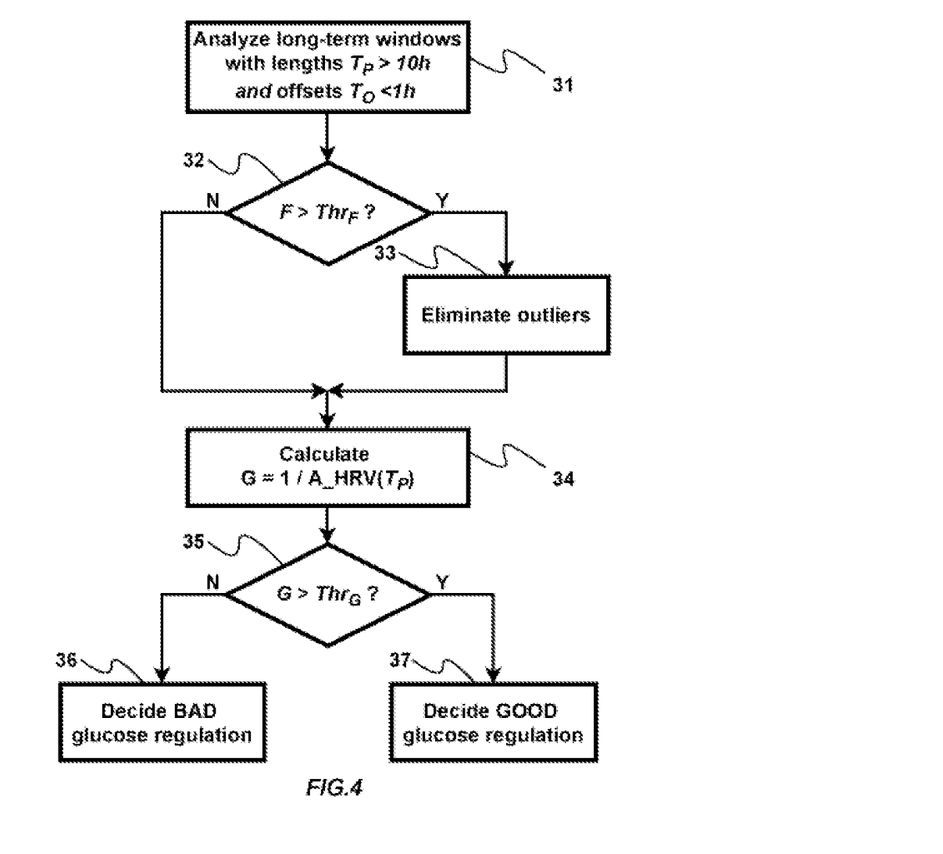
FIG. 4 shows a method for calculating the ability to control glucose.

FIG. 4 shows a method to calculate the ability to control the glucose level. In one embodiment, the method to calculate the ability to control the glucose may use the long-term pulse HRV. The method starts with analyzing the long-term windows with time period lengths of $T_P$ larger than threshold $Thr_P$, and offsets $T_O$ smaller than $Thr_S$ (Block 31). The method compares the fluctuation index F for the analyzed windows to the threshold $Thr_F$ (Block 32). In case the fluctuation index F is higher than the threshold (Y branch of Block 32) the method eliminates the outliers (Block 33) in the analyzed window with time period of $T_P$. The method calculates a set of average values of calculated HRV for the window with time period lengths of $T_P$ (Block 34).

One embodiment may include calculation of time domain ASDNN calculated as average of SDNN calculated on 5-minute intervals over a 24 h period. Another embodiment may include RMSSD and pNN50 parameters calculated for time period lengths of $T_P$=12 h and offsets $T_O$=2 min. Various embodiments may include averages of pulse HRV, including A_SDP, A_rMSP, and A_pP3 for different time offsets and long-term window measurements.

The set of Threshold values $Thr_G$ contains threshold values for each HRV parameter. The method compares if the calculated HRV values are larger than the corresponding threshold values and decides based on majority of comparison results (Block 35). If the majority of calculated HRV values is smaller than the corresponding threshold values (N branch of Block 35) the method decides bad glucose regulation ability (Block 36) in the analyzed window with time period of $T_P$. In case the majority of calculated values are higher than the threshold (Y branch of Block 35) the method decides good glucose regulation ability (Block 37) in the analyzed window with time period of $T_P$.

Figure 5:
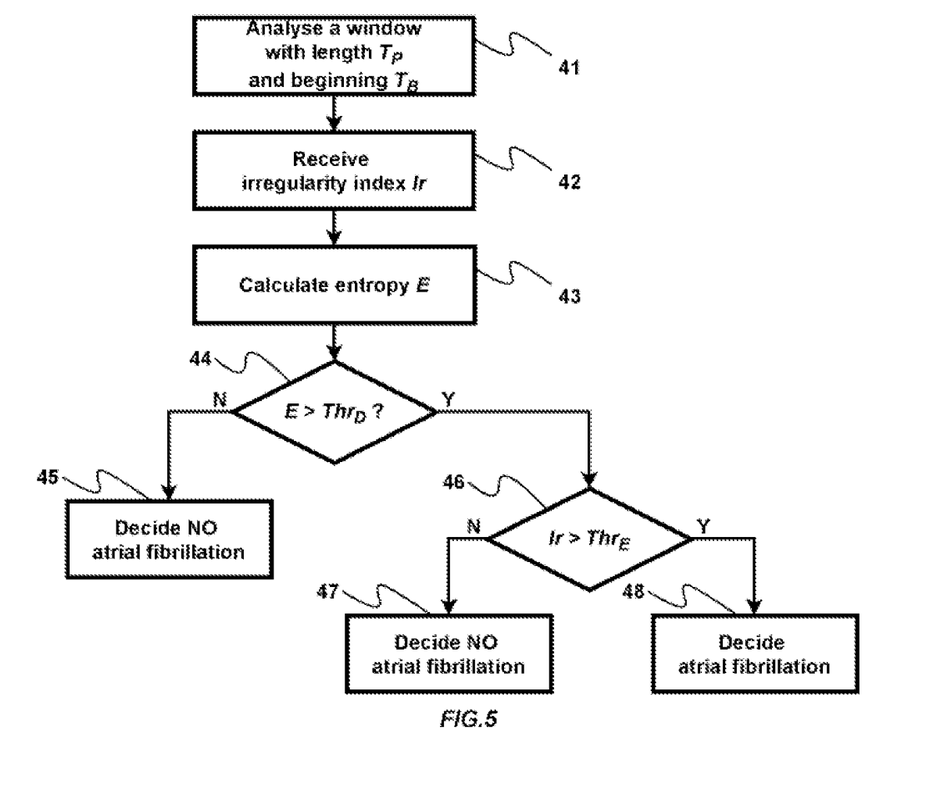
FIG. 5 shows a method for calculating the atrial fibrillation.

FIG. 5 shows a method to detect atrial fibrillation. The method to detect atrial fibrillation starts with analysis of a window with time period of $T_P$ and beginning in time $T_B$ (Block 41). The method uses the irregularity index (Block 42) in combination with calculation of entropy, such as the Shannon entropy. The method calculates an entropy E to represent if the data items are distributed over a range and providing information about the data spread or diversity (Block 43). In one embodiment, the method may calculate an information entropy, such as Shannon entropy. In other embodiments, the method may use other entropy in calculations. The entropy for the analyzed window with time period of $T_P$ is a value between 0 and 1.

In one embodiment, the method calculates Shannon entropy using beat-to-beat intervals. In another embodiment, the method calculates Shannon entropy using instantaneous pulses, that have been proven in our early experiments as more relevant in making decisions for atrial fibrillation.

The method checks if the value of the calculated entropy E is smaller than a threshold value $Thr_D$ (Block 44). The smaller the entropy is, the values in the analyzed interval are not dispersed, which leads that there is no need to analyze their regularity, since the rhythm is without large discrepancies. If the entropy is smaller than the threshold (N branch of Block 44), the method decides that there is no atrial fibrillation detected in the analyzed window with time period of $T_P$ (Block 45). In case the entropy is higher than the threshold (Y branch of Block 44), the method continues with comparison of the irregularity index Ir to the threshold $Thr_E$ (Block 46). If the entropy is smaller than the threshold (N branch of Block 46) the method decides that there is no atrial fibrillation detected in the analyzed window with time period of $T_P$ (Block 47). In case the entropy is higher than the threshold (Y branch of Block 46) the method decides there is atrial fibrillation detected in the analyzed window with time period of $T_P$ (Block 48).

FIG. 6 shows a method for calculating the psychophysical condition. The method for calculating the psychophysical condition is based on the built HRV profile (Block 18). The method calculates values of time spent in Low HRV range DTL and ratio versus target time in low range $T_L$ (Block 51). The method calculates time spent in Normal HRV range DTN and ratio versus target time in normal range $T_N$ (Block 52). The method calculates time spent in High HRV range DTH and ratio versus target time in low range $T_H$ (Block 53). All these values are further used by the method to calculate the HRV indicator HRVI (Block 54). The method calculates HRVI as a product of $T_N$ and $T_H$ divided by $T_L$ (Block 54).

The method compares the calculated indicator HRVI to a threshold $Thr_E$ (Block 55). If the indicator HRVI is smaller than the threshold (N branch of Block 55). the method decides BAD psychophysical condition detected (Block 56) in the analyzed window with time period of $T_P$. In case the indicator HRVI is higher than the threshold (Y branch of Block 55) the method decides good psychophysical condition detected (Block 57) in the analyzed window with time period of $T_P$. The more time spent in target ranges from the HRV profile calculated in method Block 15 means balanced psychophysical condition, while, in the opposite, it will mean disruptions in the overall psychophysical condition, including stress, especially if the time spent in low range is higher causing that the indicator HRVI is smaller.

The invention claimed is:

1. A system for non-invasive monitoring comprising a device for sensing heartbeats and a data processing device, wherein the data processing device is configured to receive beat annotations;

detect rhythm patterns, wherein a rhythm pattern is a sequence of two or more successive beats, wherein a beat-to-beat interval differs from an average beat-to-beat interval from a first number of previous beat-to-beat intervals by a value higher than a predefined threshold, wherein the sequence of successive beats is repeated at least three times;

calculate an instantaneous pulse, wherein the data processing device is configured to use a reciprocal value of a time interval between two succeeding beats, wherein the data processing device excludes intervals where noise, artifacts, wrong detections and rhythm patterns are detected, wherein the data processing device is configured to convert the reciprocal value of the time interval between two successive beats in beats per minute, wherein the data processing device is configured to compare the instantaneous pulse against a third threshold to detect if the instantaneous pulse is within a limit of a mammal;

calculate HRV parameters for a fourth window time interval, wherein the fourth window time interval is a sub-interval of the a heartrate measurement, wherein the HRV parameters comprise:

an average of said instantaneous pulses within the fourth window time interval;

a harmonic mean of said instantaneous pulses within the fourth window time interval;

a standard deviation of said instantaneous pulses within the fourth window time interval;

a root mean square of said instantaneous pulses within the fourth window time interval;

a number of successive instantaneous pulses whose difference is larger than a fifth heartrate value within the fourth window time interval;

a ratio between the number of successive instantaneous pulses whose difference is larger than the fifth heartrate value and the number of instantaneous pulses within the fourth window time interval.

2. The system in claim 1, wherein the data processing device is configured to calculate said HRV parameters for a plurality of window time intervals, wherein the fourth window time interval belongs to the plurality of window time intervals, wherein a beginning of the fourth window time interval is a multiple of an offset time interval from a beginning of the received heartrate measurement, wherein the data processing device is further configured to calculate:

arithmetic mean of the HRV parameters for the plurality of window time intervals;

harmonic mean of the HRV parameters for the plurality of window time intervals;

standard deviation of the HRV parameters for the plurality of window time intervals;

root mean square of the HRV parameters for the plurality of window time intervals.

3. The system as in claim 2, wherein for the fourth window time interval and for a plurality of values for the multiple of the offset time intervals, the data processing device is configured to find a maximum of the HRV parameters;

find an average of the HRV parameters;

eliminate outlier values that are distant from an average range and an expected range of a majority the HRV parameters;

calculate an HRV fluctuation index as a ratio between the standard deviation of the HRV parameters and the average of the HRV parameters.

4. The system as in claim 2, wherein for the fourth window time interval and for a multiple of the offset time intervals, the data processing device is configured to calculate an irregularity index as a number of beats without said rhythm patterns versus a total number of beats.

5. The system as in claim 2, wherein the data processing device is further configured to build an HRV profile for a first HRV parameter, wherein the HRV profile comprises:

a first detected time in a low HRV range;

a second detected time in a normal HRV range;

a third detected time in a high HRV range;

a first target time in the low HRV range;

a second target time in the normal HRV range;

a third target time in the high HRV range;

a first ratio of the first detected time in the low HRV range versus the first target time;

a second ratio of the second detected time in the normal HRV range versus the second target time;

a third ratio of the third detected time in the high HRV range versus the third target time.

6. The system as in claim 3, wherein the data processing device is further configured to detect an ability to control glucose, wherein a bad ability to control glucose is detected if a fifth reciprocal value of the HRV parameters is higher than a sixth threshold, wherein a good ability to control glucose is detected if the fifth reciprocal value of the HRV parameters is lower than or equal to the sixth threshold.

7. The system in claim 4, wherein the data processing device is further configured to calculate an entropy;

detect atrial fibrillation if the entropy is larger than a seventh threshold and the irregularity index is higher than an eighth threshold, wherein no atrial fibrillation is detected otherwise.

8. The system in claim 5, wherein the data processing device is further configured to detect psychophysical condition, wherein balanced psychophysical condition is detected if time spent in target ranges of the HRV profile is larger than a threshold, wherein disrupted psychophysical condition is detected otherwise.

9. A system for non-invasive monitoring comprising a device for sensing heartbeats and a data processing device, wherein the data processing device is configured to receive beat annotations;

detect rhythm patterns, wherein a rhythm pattern is a sequence of two or more successive beats, wherein a beat-to-beat interval differs from an average beat-to-beat interval from a first number of previous beat-to-beat intervals by a value higher than a predefined threshold, wherein the sequence of a second number of successive beats is repeated at least three times;

calculate acceptable beat-to-beat intervals, wherein the data processing device is configured to compare the beat-to-beat interval against a third threshold to detect if the beat-to-beat intervals is within a limit of a mammal;

calculate HRV parameters for a fourth window time interval, wherein the fourth window time interval is a sub-interval of a heartrate measurement, wherein the HRV parameters comprise:

an average of said beat-to-beat intervals within the fourth window time interval;
a harmonic mean of said beat-to-beat intervals within the fourth window time interval;
a standard deviation of said beat-to-beat intervals within the fourth window time interval;
a root mean square of said beat-to-beat intervals within the fourth window time interval;
a number of successive beat-to-beat intervals whose difference is larger than fifth time interval within the fourth window time interval;
a ratio between the number of successive instantaneous pulses whose difference is larger than fifth time interval and the number of instantaneous pulses within the fourth window time interval;
wherein the data processing device is configured to calculate HRV parameters for a plurality of window time intervals, wherein the fourth window time interval belongs to the plurality of window time intervals, wherein a beginning of the fourth window time interval is a multiple of an offset time interval from a beginning of the received heartrate measurement, wherein the data processing device is further configured to calculate:
arithmetic mean of the HRV parameters for the plurality of fourth window time intervals;
harmonic mean of the HRV parameters for the plurality of fourth window time intervals;
standard deviation of the HRV parameters for the plurality of fourth window time intervals;
root mean square of the HRV parameters for the plurality of fourth window time intervals.

10. A method for non-invasive monitoring comprising:
receiving beat annotations;
detecting rhythm patterns, wherein a rhythm pattern is a sequence of two or more successive beats, wherein a beat-to-beat interval differs from an average beat-to-beat interval from a first number of previous beats by a value higher than a predefined threshold, wherein the sequence of successive beats is repeated at least three times;
calculating an instantaneous pulse, wherein the instantaneous pulse is a reciprocal value of a time interval between two succeeding beats, wherein intervals that contain noise, artifacts, wrong detections and rhythm patterns are excluded, wherein the instantaneous pulse value is converted in beats per minute, wherein the instantaneous pulse is compared against a third threshold to detect if the instantaneous pulse is within a limit of a mammal;
calculating HRV parameters for a fourth window time interval, wherein the fourth window time interval is a sub-interval of a heartrate measurement, wherein the pulse HRV parameters comprise:
an average of said instantaneous pulses within the fourth window time interval;
a harmonic mean of said instantaneous pulses within the fourth window time interval;
a standard deviation of said instantaneous pulses within the fourth window time interval;
a root mean square of said instantaneous pulses within the fourth window time interval;
a number of successive instantaneous pulses whose difference is larger than a fifth heartrate value within the fourth window time interval;
a ratio between the number of successive instantaneous pulses whose difference is larger than the fifth heartrate value and the number of instantaneous pulses within the fourth window time interval.

11. The method of claim 10, wherein said pulse HRV parameters are calculated for a plurality of window time intervals, wherein the fourth window time interval belongs to the plurality of window time intervals, wherein a beginning of the fourth window time interval is a multiple of an offset time interval from a beginning of the received heartrate measurement, comprising:
calculating an arithmetic mean of the HRV parameters for the plurality of window time intervals;
calculating a harmonic mean of the HRV parameters for the plurality of window time intervals;
calculating a standard deviation of the HRV parameters for the plurality of window time intervals;
calculating a root mean square of the HRV parameters for the plurality of window time intervals.

12. The method according to claim 11, further comprising:
finding an average of the HRV parameters;
finding a maximum of the HRV parameters;
eliminating outlier values that are distant from an average range and an expected range of a majority of the HRV parameters;
calculating an HRV fluctuation index as a standard deviation of the HRV parameters,
wherein the HRV fluctuation index is calculated for the fourth window time interval and for a plurality of values for the multiple of the offset time intervals.

13. A method according to claim 11, further comprising:
calculating an irregularity index as a number of beats without said rhythm patterns;
versus a total number of beats for the fourth window time interval and for a multiple of the offset time interval.

14. A method according to claim 11, comprising:
building an HRV profile for a first HRV parameter, wherein the HRV profile comprises:
a first detected time in a low HRV range;
a second detected time in a normal HRV range;
a third detected time in a high HRV range;
a first target time in the low HRV range;
a second target time in the normal HRV range;
a third target time in the high HRV range;
a first ratio of the first detected time in the low HRV range versus the first target time;
a second ratio of the second detected time in the normal HRV range versus second target time;
a third ratio of the third detected time in the high HRV range versus target the third time.

15. A method according to claim 12, further comprising:
detecting an ability to control glucose, wherein a bad ability to control glucose is detected if a fifth reciprocal value of the HRV parameters is higher than a sixth threshold, wherein a good ability to control glucose is detected if the fifth reciprocal value of the HRV parameters is lower than or equal to the sixth threshold.

16. The method of claim 13 comprising:
calculating an entropy;
detecting atrial fibrillation if the entropy is larger than a seventh threshold and the irregularity index is higher than an eighth threshold.

17. The method of claim 14, further comprising:
detecting psychophysical condition, wherein balanced psychophysical condition is detected if time spent in target ranges of the HRV profile is larger than a ninth threshold, wherein disrupted psychophysical condition is detected otherwise.

18. A method for non-invasive monitoring comprising:
receiving beat annotations;
detecting rhythm patterns, wherein a rhythm pattern is a sequence of two or more successive beat-to-beat intervals, wherein a beat-to-beat interval differs from an average beat-to-beat interval from a first number of previous beats by a value higher than a predefined threshold, wherein the sequence of a second number of successive beats is repeated at least three times;
calculating acceptable beat-to-beat intervals, wherein the data processing device is configured to compare the beat-to-beat interval against a third threshold to detect if the beat-to-beat intervals is within a limit of a mammal;
calculating HRV parameters for a fourth window time interval, wherein the fourth window time interval is a sub-interval of a heartrate measurement, wherein the HRV parameters comprise:
  an average of said beat-to-beat intervals within the fourth window time interval;
  a harmonic mean of said beat-to-beat intervals within the fourth window time interval;
  a standard deviation of said beat-to-beat intervals within the fourth window time interval;
  a root mean square of said beat-to-beat intervals within the fourth window time interval;
  a number of successive beat-to-beat intervals from said beat-to-beat intervals whose difference is larger than a fifth heartrate threshold within the fourth window time interval;
a ratio between the number of successive beat-to-beat intervals whose difference is larger than fifth heartrate threshold and said beat-to-beat intervals within the fourth window time interval;
wherein said HRV parameters are calculated for a plurality of window time intervals, wherein the fourth window time interval belongs to the plurality of window time intervals, wherein a beginning of the fourth window time interval is a multiple of an offset time interval from a beginning of the received heartrate measurement, comprising:
  calculating an arithmetic mean of the HRV parameters for the plurality of window time intervals;
  calculating a harmonic mean of the HRV parameters for the plurality of window time intervals;
  calculating a standard deviation of the HRV parameters for the plurality of window time intervals;
  calculating a root mean square of the HRV parameters for the plurality of window time intervals.

* * * * *